(12) United States Patent
Koyanagi et al.

(10) Patent No.: US 7,863,345 B2
(45) Date of Patent: Jan. 4, 2011

(54) PROCESS FOR PRODUCING MICROPARTICULATE HARDENING CATALYST

(75) Inventors: Hiroo Koyanagi, Tokyo (JP); Makoto Uchida, Tokyo (JP); Shigeru Moteki, Tokyo (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 514 days.

(21) Appl. No.: 11/988,248

(22) PCT Filed: Jul. 6, 2006

(86) PCT No.: PCT/JP2006/313483

§ 371 (c)(1),
(2), (4) Date: Jan. 28, 2008

(87) PCT Pub. No.: WO2007/007635

PCT Pub. Date: Jan. 18, 2007

(65) Prior Publication Data

US 2009/0029848 A1 Jan. 29, 2009

(30) Foreign Application Priority Data

Jul. 7, 2005 (JP) .............................. 2005-198560

(51) Int. Cl.
| | |
|---|---|
| C08F 2/50 | (2006.01) |
| C08F 2/46 | (2006.01) |
| C08J 3/28 | (2006.01) |
| B05D 5/00 | (2006.01) |
| B05D 1/00 | (2006.01) |
| B05D 1/02 | (2006.01) |
| C08K 9/10 | (2006.01) |
| B01J 13/04 | (2006.01) |
| B01J 13/20 | (2006.01) |
| B01J 13/02 | (2006.01) |
| B01J 13/14 | (2006.01) |

(52) U.S. Cl. .............................. 522/71; 522/74; 522/75; 522/76; 522/78; 522/79; 522/82; 522/83; 522/153; 522/157; 522/158; 522/178; 522/181; 522/182; 264/5; 264/7; 264/10; 523/200; 523/205; 523/210; 523/211; 428/402; 428/402.2; 428/402.21; 428/402.22; 428/402.24; 427/212; 427/213.3; 427/213.31; 427/213.34; 427/512

(58) Field of Classification Search ................. 522/178, 522/182, 157, 158, 153, 181, 71, 74, 75, 522/76, 78, 79, 82, 83; 264/5, 7, 10; 523/200, 523/205, 210, 211; 428/402, 402.2, 402.21, 428/402.22, 402.24; 427/512, 508, 517, 427/212, 213.3, 213.31, 213.34
See application file for complete search history.

(56) References Cited

U.S. PATENT DOCUMENTS

| | | | | |
|---|---|---|---|---|
| 2,947,717 | A * | 8/1960 | Masters et al. | 525/533 |
| 3,791,980 | A * | 2/1974 | Goldsmith | 523/205 |
| 4,172,776 | A * | 10/1979 | Singelyn | 522/3 |
| 4,273,831 | A * | 6/1981 | Singelyn | 428/402 |
| 4,663,072 | A * | 5/1987 | Cheung | 528/91 |
| 4,845,166 | A * | 7/1989 | Sadhir et al. | 528/109 |
| 4,983,668 | A * | 1/1991 | Cutter et al. | 525/23 |
| 5,302,456 | A * | 4/1994 | Matsui | 428/407 |
| 6,291,605 | B1 * | 9/2001 | Freeman et al. | 526/88 |
| 6,592,990 | B2 * | 7/2003 | Schwantes | 428/402.21 |
| 7,022,747 | B2 * | 4/2006 | Lepkowski et al. | 522/3 |
| 7,722,939 | B2 * | 5/2010 | Schwantes et al. | 428/40.2 |
| 7,722,940 | B2 * | 5/2010 | Schwantes et al. | 428/40.2 |
| 2002/0056914 | A1* | 5/2002 | Akram | 257/762 |
| 2006/0073334 | A1* | 4/2006 | Schwantes et al. | 428/402.2 |
| 2008/0019904 | A1* | 1/2008 | Boehmer et al. | 424/1.29 |
| 2008/0025983 | A1* | 1/2008 | Adams et al. | 424/139.1 |
| 2008/0090943 | A1* | 4/2008 | Xu et al. | 523/461 |

FOREIGN PATENT DOCUMENTS

| | | | | |
|---|---|---|---|---|
| JP | 6-16788 | | | 1/1994 |
| JP | 8-301985 | | | 11/1996 |
| JP | 2000080146 | A | * | 3/2000 |
| JP | 2001-55431 | | | 2/2001 |
| JP | 2001-139667 | | | 5/2001 |
| JP | 2001139667 | A | * | 5/2001 |
| JP | 2001-232178 | | | 8/2001 |
| JP | 2003-326148 | | | 11/2003 |

* cited by examiner

*Primary Examiner*—Sanza L McClendon
(74) *Attorney, Agent, or Firm*—Nields, Lemack & Frame, LLC

(57) ABSTRACT

A process for producing a microparticulate hardening catalyst, comprising the steps of jetting a liquid composition containing epoxy resin hardening catalyst (A), monomer having an ethylenically unsaturated group (B) and photopolymerization initiator (C) through a minute nozzle into a gas so as to form microparticles; and while the microparticles are floating, irradiating the same with high-energy rays to thereby effect polymerization of the monomer having an ethylenically unsaturated group (B).

3 Claims, No Drawings

PROCESS FOR PRODUCING MICROPARTICULATE HARDENING CATALYST

TECHNICAL FIELD

The present invention relates to a method for producing a curing catalyst in particulate form. In particular, the present invention relates to a method for producing a curing catalyst in particulate form applicable to semiconductor sealing materials, underfill materials, sealants, adhesives, insulating materials, solder masks, or dry films.

BACKGROUND ART

There is presently a desire to achieve higher precision and higher density in semiconductor sealing materials, underfill materials, sealants, adhesives, insulating materials, solder masks, and dry films for the purpose of reducing the size and the weight of portable equipment and increasing communication speed. Under these circumstances, there is a desire for the materials having properties such as higher stability, flowability, and heat resistance. There is also a desire to develop a method for producing a curing catalyst in particulate form usable for a composition constituting the materials.

Conventionally, there have been reported many methods for preparing particulates (microcapsules) composed of a core material and a polymer material coating the core material. The known methods use a dispersion system such as an emulsion polymerization method, a suspension polymerization method, an interface reaction method, or a submerged drying method. These methods have advantages such that no special equipment is required, the size of particulates is easy to adjust to some degree, and the properties and the structures of particulate membranes can be controlled. Thus, the methods are utilized in various fields, for example, in practical use for pressure sensitive copying papers, pressure measurement sheets, pressure sensitive adhesives, liquid crystal display materials, controlled release pharmaceuticals, and controlled release agricultural chemicals.

The conventional production methods, however, have a tendency that only components of particulates according to each method are applicable for producing more uniform particulates. This causes a problem of narrowing the scope of selection of components. In addition, the properties of particulates to be obtained considerably depend on parameters of particulate size and membrane thickness (the diameter and the thickness of a wall membrane) of particulates. Therefore, in order to make particulates to have excellent properties uniformly, it is necessary to control the particulate size and membrane thickness within a proper range. However, particulates are conventionally produced by techniques such as forming lumps of core materials in a liquid by dispersion using a dispersing agent and stirring. In employing this production method, the particulate size and membrane thickness of microcapsules are controlled by adjusting the rate of stirring or the concentration of a dispersing agent, resulting in variation in both of the particulate size and the membrane thickness. In summary, it is difficult to control microcapsules precisely such that the microcapsules have a desired level of particulate size and membrane thickness, and further make the microcapsules uniform.

In order to overcome the problems, Patent Document 1 discloses a method of producing microcapsules (phase separation method, submerged drying method, interfacial polymerization method, or in situ polymerization method) by ejecting a liquid composition composed of a polymer material to form a membrane and a core material into a solution by an inkjet method. The method is excellent in that the particulate size of microcapsules can be controlled precisely.

The method, however, has a drawback that obtained microcapsules are required to be separated from the liquid into which the composition is ejected. The method has many unsolved industrial and environmental problems such that it takes much time to separate microcapsules having a particulate size on the order of millimeters to nanometers by filtration, and large amounts of a cleaning fluid are required to wash the microcapsules.

Patent Document 1: JP-A-2001-232178

An object of the present invention is to provide a method for producing a curing catalyst in particulate form that remains stable and flowable for a long time after a base compound and a curing agent are combined into one pack, and usable for a composition compatible with high performance of present underfill materials, sealants, adhesives, insulating materials, solder masks, or the like. Another object of the present invention is to provide a method for producing a curing catalyst in particulate form of which particulate size is controlled precisely and uniformly, and the produced catalyst can be separated and extracted easily.

DISCLOSURE OF THE INVENTION

The present inventors have studied thoroughly in order to overcome the problems, and the present invention has been accomplished.

That is, the present invention is as follows.

(1) A method for producing a curing catalyst in particulate form comprising the steps of forming particulates by ejecting a liquid composition from a micro nozzle into a gas, the composition containing (A) a curing catalyst for an epoxy resin, (B) a monomer comprising an unsaturated ethylene group, and (C) a photopolymerization initiator; and polymerizing (B) the monomer comprising an unsaturated ethylene group by exposing the particulates suspended in the gas to a high energy beam.

(2) The method according to (1), wherein the liquid composition is ejected by spray method or inkjet method.

(3) The method according to (1) or (2), wherein (B) the monomer comprising an unsaturated ethylene group contains a compound comprising at least two unsaturated ethylene groups in the molecule.

The production method according to the present invention makes it possible to produce a curing catalyst in particulate form of which particulate size is controlled precisely and uniformly, and the produced catalyst can be separated and extracted easily.

BEST MODE FOR CARRYING OUT THE INVENTION

A method for producing a curing catalyst in particulate form according to the present invention is characterized by the steps of forming particulates by ejecting a liquid composition from a micro nozzle into a gas, the composition containing (A) a curing catalyst for an epoxy resin, (B) a monomer comprising an unsaturated ethylene group, and (C) a photopolymerization initiator; and polymerizing (B) the monomer comprising an unsaturated ethylene group by exposing the particulates suspended in the gas to a high energy beam.

(A) a curing catalyst for an epoxy resin is not restricted as long as the catalyst effects ring opening reaction of epoxy groups of compounds such as aliphatic amines, aromatic amines, imidazoles, acid anhydrides, phenols, carboxy compounds, phosphines, sulfonium salts, or iodonium salts. It is preferred that the catalyst is unreactive to (B) a monomer comprising an unsaturated ethylene group, which is described later, and soluble in the (B) monomer.

(B) a monomer comprising an unsaturated ethylene group is not restricted as long as the monomer comprises an unsaturated ethylene group in the molecule. Examples of the monomer may include: monofunctional monomers such as (meth)acrylic acid, (meth)acrylic esters, styrene, α-methylstyrene, tetrahydrofurfuryl (meth)acrylate, ε-caprolactone modified tetrahydrofurfuryl (meth)acrylate, or a reaction product between phenyl glycidyl ether and (meth)acrylic acid; bifunctional monomers such as divinylbenzene, a reaction product between neopentyl glycol hydroxypivalate and (meth)acrylic acid, neopentyl glycol di(meth)acrylate, tetramethylene glycol di(meth)acrylate, a reaction product between 1,6-hexane diglycidyl ether and (meth)acrylic acid, an adduct of di(meth)acrylate with ε-caprolactone-modified neopentyl glycol hydroxypivalate, a reaction product between bisphenol type diglycidyl ether and (meth)acrylic acid, a reaction product between alkylene oxide modified bisphenol and (meth)acrylic acid, a reaction product between dioxane diglycol and (meth)acrylic acid (such as KAYARAD R-604 manufactured by Nippon Kayaku Co., Ltd.), or a reaction product between tricyclodecane dimethanol and (meth)acrylic acid (such as KAYARAD R-684 manufactured by Nippon Kayaku Co., Ltd.); and polyfunctional monomers such as polyethylene glycol di(meth)acrylate, tripropylene glycol di(meth)acrylate, trimethylolpropane tri(meth)acrylate, alkylene oxide modified trimethylolpropane polytri(meth)acrylate, glycerol polypropoxy tri(meth)acrylate, pentaerythritol tetra(meth)acrylate, pentaerythritol tri(meth)acrylate, a poly(meth)acrylate reaction product between dipentaerythritol and ε-caprolactone, or dipentaerythritol poly(meth)acrylate. These monomers may be used alone or in combination as long as the monomers are liquid at ordinary temperatures. It is preferred that a monofunctional monomer and/or a bifunctional monomer is used as a base material and a small amount of a polyfunctional monomer is added thereto for the purpose of obtaining viscosity suitable for spray method or inkjet method for producing a curing catalyst in particulate form. The polyfunctional monomer is used to adjust the hardness of a curing catalyst in particulate form and controlled release of the (A) curing catalyst. The amount of the polyfunctional monomer is generally 1 to 20% by weight based on the (B) monomer comprising an unsaturated ethylene group.

(C) a photopolymerization initiator can be any initiator as long as it is decomposed upon exposure to light and generates an active species for polymerizing unsaturated ethylene groups. Specific examples of the (C) photopolymerization initiator may include: benzoins such as benzoin, benzoin methyl ether, benzoin ethyl ether, benzoin propyl ether, and benzoin isobutyl ether; acetophenones such as acetophenone, 2,2-diethoxy-2-phenylacetophenone, 2,2-diethoxy-2-phenylacetophenone, 1,1-dichloroacetophenone, 2-hydroxy-2-methyl-phenylpropane-1-one, diethoxyacetophenone, 1-hydroxycyclohexylphenylketone, and 2-methyl-1-[4-(methylthio)phenyl]-2-morphorinopropane-1-one; anthraquinones such as 2-ethylanthraquinone, 2-tertiary-butylanthraquinone, 2-chloroanthraquinone, and 2-amylanthraquinone; thioxanthones such as 2,4-diethylthioxanthone, 2-isopropylthioxanthone, and 2-chlorothioxanthone; ketals such as acetophenone dimethyl ketal and benzyl dimethyl ketal; benzophenones such as benzophenone, 4-benzoyl-4'-methyldiphenylsulfide and 4,4'-bismethylaminobenzophenone; and phosphine oxides such as 2,4,6-trimethylbenzoyl-diphenylphosphine oxide and bis(2,4,6-trimethylbenzoyl)-phenylphosphine oxide. These initiators may be used alone or in combination in accordance with the exposure wavelength of a light source to be used for producing a curing catalyst in particulate form. These initiators may be used in combination with an accelerating agent or the like as necessary. Examples of the accelerating agent may include: tertiary amines such as triethanolamine and methyldiethanolamine; and benzoic acid derivatives such as ethyl N,N-dimethylamino benzoate and isoamyl N,N-dimethylamino benzoate. The amount of the accelerating agent to be used is generally 0 to 100% by weight based on the (C) photopolymerization initiator.

A preferred content of each component based on 100 parts by weight in total of the components is 10 to 90 parts by weight of (A) a curing catalyst for an epoxy resin, 10 to 80 parts by weight of (B) a monomer comprising an unsaturated ethylene group, and 1 to 30 parts by weight of (C) a photopolymerization initiator. It is preferred that a liquid composition obtained from the components have a viscosity within the range of 0.1 to 30,000 mPa·s. A liquid composition having a viscosity less than 0.1 mPa·s results in a curing catalyst in particulate form having too small particulate size. Such a curing catalyst provides a composition having low stability, which is not preferable. In contrast, a liquid composition having a viscosity greater than 30,000 mPa·s results in a curing catalyst in particulate form having too large particulate size. When a composition produced by such a catalyst is used as an underfill or the like, the underfill is less prone to flow into semiconductor chips and gaps. In this case, because the underfill substantially cannot be used, the liquid composition having a too high viscosity is not preferable.

There is described a method for producing a curing catalyst in particulate form according to the present invention. A liquid composition prepared in the aforementioned proportion is ejected into a sealed vessel preferably by spray method or inkjet method to form particulates. Applicable spray methods may include: a single-fluid nozzle ejecting method in which a liquid composition is directly pressured to eject from a spray nozzle; and a two-fluid nozzle ejecting method in which a high pressure gas is used against a liquid composition thereby generating pressure difference so as to eject the liquid composition from a spray nozzle. The pressure in the single-fluid nozzle ejecting method depends on the shape of a nozzle or the viscosity of the liquid composition to be used, but a pressure of about 1 to 30 MPa is preferably applied. The gas used in the two-fluid nozzle ejecting method is preferably used at a pressure of about 0.1 to 10 MPa in an amount of 1 to 100 L/min.

An inkjet head to be used in the inkjet method is an ordinary head employed for an inkjet recording system such as a piezo type head or a bubble type head. The piezo type head is particularly preferable, because use of the head does not make the temperature of ejected substances high, and the qualities of components constituting the liquid composition do not alter. It is preferred that the ejecting amount of particulates of a liquid composition from an inkjet head is 0.1 to 100 nL per particulate, and the ejecting rate is 3 to 10 m/s. In particular, it is especially preferred that the ejecting temperature of an inkjet head is adjusted within the range of −15 to 40° C. so that the viscosity of the liquid composition becomes constant.

While the liquid composition ejected by the method is suspended in the sealed vessel, a high energy beam such as visible rays, ultraviolet rays, or X-rays is irradiated to the liquid composition thereby generating active radicals from (C) a photopolymerization initiator and effecting photo polymerization of (B) monomers comprising an unsaturated ethylene group. (A) a curing catalyst for an epoxy resin is added or adhered to the photopolymerized (B) monomers comprising an unsaturated ethylene group so as to produce a curing catalyst in particulate form according to the present invention. A gas for suspending the ejected liquid composition can be air, but it is particularly preferred that the gas is an inert gas such as nitrogen or argon, which does not inhibit radical polymerization reactions. When ultraviolet rays are irradiated, examples of ultraviolet ray generating equipment may include low pressure mercury lamps, high pressure mercury lamps, ultra-high pressure mercury lamps, xenon lamps, and ultraviolet ray generating lasers such as excimer lasers. The dose of the high energy beam depends on the type and the amount of (C) a photopolymerization initiator contained in the liquid composition, but the dose is preferably in the range of 10 to 10,000 mJ/cm$^2$.

Thus obtained curing catalyst in particulate form is contained in an epoxy resin composition containing an epoxy resin and a curing agent, and used as a one-pack type composition.

The epoxy resin can be any epoxy resin generally used for electrical or electronic parts. Examples of the epoxy resin may include: glycidyl compounds of tetrabromobisphenol A, tetrabromobisphenol F, bisphenol A, tetramethylbisphenol F, bisphenol F, bisphenol S, bisphenol K, biphenol, tetramethylbiphenol, hydroquinone, methylhydroquinone, dimethylhydroquinone, trimethylhydroquinone, di-ter.butylhydroquinone, resorcinol, methylresorcinol, catechol, methylcatechol, dihydroxynaphthalene, dihydroxymethylnaphthalene, and dihydroxydimethylnaphthalene; and glycidyl compounds of condensation products of phenols or naphthols and aldehydes, condensation products of phenols or naphthols and xylene glycol, condensation products of phenols and isopropenylacetophenone, reaction products of phenols and dicyclopentadiene. These epoxy resins can be obtained by methods known in the art.

Examples of the phenols may include: phenol, cresol, xylenol, butylphenol, amylphenol, nonyl phenol, catechol, resorcinol, methylresorcinol, hydroquinone, phenylphenol, bisphenol A, bisphenol F, bisphenol K, bisphenol S, biphenol, and tetramethylbiphenol.

Examples of the naphthols may include: 1-naphthol, 2-naphthol, dihydroxynaphthalene, dihydroxymethylnaphthalene, dihydroxydimethylnaphthalene, and trihydroxynaphthalene.

Examples of the aldehydes may include: formaldehyde, acetaldehyde, propylaldehyde, butylaldehyde, valeraldehyde, caproic aldehyde, benzaldehyde, chlorobenzaldehyde, bromobenzaldehyde, glyoxal, malonaldehyde, succinaldehyde, glutaraldehyde, adipinaldehyde, pimelic aldehyde, sebacic aldehyde, acrolein, crotonaldehyde, salicylaldehyde, phthalaldehyde, and hydroxybenzaldehyde. Examples of the epoxy resins to be used in the present invention are mentioned above, but any epoxy resin used for electrical or electronic parts may be used. The aldehydes may be used alone or in combination.

The curing agent can be any curing agent used for electrical or electronic parts. Specific examples of the curing agent may include: condensation products of phenols or naphthols and aldehydes, condensation products of phenols or naphthols and xylene glycol, condensation products of phenols and isopropenylacetophenone, and reaction products of phenols and dicyclopentadiene. Examples of the phenols and the naphthols may include tetrabromobisphenol A, tetrabromobisphenol F, bisphenol A, tetramethylbisphenol F, bisphenol F, bisphenol S, bisphenol K, biphenol, tetramethylbiphenol, hydroquinone, methylhydroquinone, dimethylhydroquinone, trimethylhydroquinone, di-ter.butylhydroquinone, resorcinol, methylresorcinol, catechol, methylcatechol, dihydroxynaphthalene, dihydroxymethylnaphthalene, and dihydroxydimethylnaphthalene. Preferred curing agents are phenol and/or naphthol agents in the molecule comprising two or more phenolic hydroxy groups. Amine curing agents can also be used such as diethylenetriamine, triethylenetriamine, tetraethylenepentamine, diethylaminopropylamine, pentaethylenehexamine, menthenediamine, isophoronediamine, N-aminoethylpiperazine, 3,9-bis(3-aminopropyl)-2,4,8,10-tetraoxyspiro(5,5)undecane adduct, bis(4-amino-3-methylcyclohexyl)methane, bis(4-aminocyclohexyl)methane, m-xylenediamine, diaminodiphenylmethane, m-phenylenediamine, diaminodiphenyl sulfone, dicyandiamide, and dihydrazide polyamide polyamine adipate. Acid anhydride curing agents can also be used such as phthalic anhydride, tetrahydrophthalic anhydride, hexahydrophthalic anhydride, methyltetrahydrophthalic anhydride, methylhexahydrophthalic anhydride, methylnadic anhydride, dodecylsuccinic anhydride, chlorendic anhydride, pyromellitic anhydride, benzophenone tetracarboxylic anhydride, ethylene glycol bis(anhydrotrimate), methylcyclohexenetetracarboxylic anhydride, trimellitic anhydride, and polyazelaic anhydride. These curing agents may be used alone or in combination.

Examples of the phenols may include: phenol, cresol, xylenol, butylphenol, amylphenol, nonyl phenol, catechol, resorcinol, methylresorcinol, hydroquinone, phenylphenol, bisphenol A, bisphenol F, bisphenol K, bisphenol S, biphenol, and tetramethylbiphenol.

Examples of the naphthols may include: 1-naphthol, 2-naphthol, dihydroxynaphthalene, dihydroxymethylnaphthalene, dihydroxydimethylnaphthalene, and trihydroxynaphthalene.

Examples of the aldehydes may include: formaldehyde, acetaldehyde, propylaldehyde, butylaldehyde, valeraldehyde, caproic aldehyde, benzaldehyde, chlorobenzaldehyde, bromobenzaldehyde, glyoxal, malonaldehyde, succinaldehyde, glutaraldehyde, adipinaldehyde, pimelic aldehyde, sebacic aldehyde, acrolein, crotonaldehyde, salicylaldehyde, phthalaldehyde, and hydroxybenzaldehyde.

The amount of the curing agent is 0.3 to 1.5 equivalents based on epoxy groups of an epoxy resin, preferably 0.5 to 1.3 equivalents. The amount less than 0.3 equivalents results in many unreacted epoxy groups whereas the amount greater than 1.5 equivalents results in large amounts of unreacted curing agent. Both of the cases are not preferable because cured substances have deteriorated thermal and mechanical properties.

The curing catalyst in particulate form is contained in the composition so that the amount of the curing catalyst contained as a core material is generally 0.2 to 7.0 parts by weight, preferably 0.2 to 6.0 parts by weight based on 100 parts by weight of an epoxy resin.

EXAMPLES

Hereinafter, the present invention is described in more detail with referring to examples. The present invention, however, is not restricted to the following examples.

Preparation of Liquid Composition-1

The following compounds were charged in a 2 L stainless beaker: 200 g of triphenyl phosphine as (A) a curing catalyst for an epoxy resin; 500 g of methyl methacrylate (monofunctional monomer), 150 g of KAYARAD R-684 (tradename for tricyclodecanedimethanoldiacrylate: bifunctional monomer manufactured by Nippon Kayaku Co., Ltd.), and 50 g of KAYARAD DPHA (tradename for dipentaerythritol hexaacrylate: polyfunctional monomer manufactured by Nippon Kayaku Co., Ltd.) as (B) monomers comprising unsaturated ethylene groups; 70 g of IRGACURE 369 (tradename, manufactured by Ciba Specialty Chemicals), 20 g of KAYACURE DETX-S (tradename for diethylthioxanthone manufactured by Nippon Kayaku Co., Ltd.), and 10 g of Lucirin TPO (tradename, manufactured by BASF) as (C) photopolymerization initiators. The beaker was stirred at 40° C. to fully dissolve solid contents. After this solution was cooled to room temperature, the solution was filtered through a 1 μm pore PTFE filter, and an insoluble matter was removed. Thus obtained solution had a viscosity of 50 mPa·s. This liquid composition is referred to as A-1.

Preparation of Liquid Composition-2

The following compounds were charged in a 2 L stainless beaker: 200 g of 2E4MZ (tradename for an imidazole compound manufactured by SHIKOKU CHEMICALS CORPORATION) as (A) a curing catalyst for an epoxy resin; 400 g of styrene (monofunctional monomer), 100 g of methacrylic acid (monofunctional monomer), 150 g of KAYARAD R-604 (tradename for dioxane glycol diacrylate: bifunctional monomer manufactured by Nippon Kayaku Co., Ltd.), and 50 g of KAYARAD DPCA-60 (tradename for ε-caprolactone modified dipentaerythritol hexaacrylate: polyfunctional monomer manufactured by Nippon Kayaku Co., Ltd.) as (B) monomers comprising unsaturated ethylene groups; 70 g of IRGACURE 184 (tradename, manufactured by Ciba Specialty Chemicals), 10 g of KAYACURE DETX-S (tradename for diethylthioxanthone manufactured by Nippon Kayaku Co., Ltd.), 10 g of camphorquinone, and 10 g of Lucirin TPO (tradename, manufactured by BASF) as (C) photopolymerization initiators. The beaker was stirred at 40° C. to fully dissolve solid contents. After this solution was cooled to room temperature, the solution was filtered through a 1 μm pore PTFE filter, and an insoluble matter was removed. Thus obtained solution had a viscosity of 40 mPa·s. This liquid composition is referred to as A-2.

Example 1

There was prepared a 10 L glass vessel substituted with nitrogen into which an ultra-high pressure mercury lamp can be irradiated from around the vessel. To the bottom of the vessel, a reduced pressure trap system loaded with a No. 131 filter (manufactured by ADVANTEC Toyo Roshi Kaisha Ltd.) was attached. The liquid composition A-1 was sprayed from the top of the glass vessel through a two-fluid nozzle SETO 0407 manufactured by H. Ikeuchi & Co., Ltd. while nitrogen at 0.5 MPa was flowed at a rate of 20 L/min into the vessel, and the liquid composition A-1 was flowed into the nozzle at a rate of 150 ml/h by using a feed pump. Concurrently with the spraying, ultraviolet rays from the ultra-high pressure mercury lamp were irradiated from around the vessel at an intensity of 5000 mJ/cm$^2$ to photopolymerize the liquid composition A-1, and a solid curing catalyst in particulate form was obtained on the filter of the trap system. Observation with SEM revealed that a maximum particulate size was 30 μm.

5 g of thus obtained curing catalyst in particulate form, 50 g of EPICOAT 828 (tradename for bisphenol A type epoxy resin manufactured by JER), and 50 g of bisphenol F were dispersed by using a bead mill. Thus obtained composition was maintained at 80° C., and gelation time was 200 minutes. In contrast, a composition obtained from triphenyl phosphine, EPICOAT 828 and bisphenol F was stored under the same condition, and gelation was complete only in 40 minutes. Both of the cured compounds exhibited good mechanical properties.

Example 2

There was prepared a 10 L glass vessel substituted with nitrogen. To the bottom of the vessel, a reduced pressure trap system loaded with a No. 131 filter (manufactured by ADVANTEC Toyo Roshi Kaisha Ltd.) was attached. The liquid composition A-2 was sprayed from the top of the glass vessel by using a piezo type inkjet head. The ejecting amount per ejection was 3 pL. Concurrently with the spraying, blue semiconductor laser was irradiated at an intensity of 500 mJ/cm$^2$ to photopolymerize the liquid composition A-2, and a solid curing catalyst in particulate form was obtained on the filter of the trap system. Observation with SEM revealed that a maximum particulate size was 10 μm.

5 g of thus obtained curing catalyst in particulate form, and 100 g of RE-602 (tradename for bisphenol F type epoxy resin manufactured by Nippon Kayaku Co., Ltd.) were dispersed by using a bead mill. Thus obtained composition was maintained at 60° C., and gelation time was 180 minutes. In contrast, a composition obtained from 2E4MZ (tradename for an imidazole compound manufactured by SHIKOKU CHEMICALS CORPORATION) and RE-602 was stored under the same condition, and gelation was complete only in 30 minutes. Both of the cured compounds exhibited good mechanical properties.

INDUSTRIAL APPLICABILITY

Curing catalysts in particulate form produced by the method according to the present invention are applicable to semiconductor sealing materials, underfill materials, sealants, adhesives, insulating materials, solder masks, or dry films.

The invention claimed is:

1. A method for producing a curing catalyst in particulate form comprising the steps of forming particulates by ejecting a liquid composition from a micro nozzle into a gas, the composition containing (A) a curing catalyst for an epoxy resin, (B) a monomer comprising an unsaturated ethylene group, and (C) a photopolymerization initiator; and polymerizing (B) the monomer comprising an unsaturated ethylene group by exposing the particulates suspended in the gas to a high energy beam.

2. The method according to claim 1, wherein the liquid composition is ejected by spray method or inkjet method.

3. The method according to claim 1 or 2, wherein (B) the monomer comprising an unsaturated ethylene group contains a compound comprising at least two unsaturated ethylene groups in the molecule.

* * * * *